United States Patent
Konishi et al.

(10) Patent No.: US 7,849,246 B2
(45) Date of Patent: Dec. 7, 2010

(54) I2C BUS CONTROL CIRCUIT

(75) Inventors: Masato Konishi, Hyogo (JP); Soshi Higuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/018,651

(22) Filed: Jan. 23, 2008

(65) Prior Publication Data
US 2008/0181206 A1  Jul. 31, 2008

(30) Foreign Application Priority Data
Jan. 29, 2007  (JP) .............................. 2007-017556

(51) Int. Cl.
G06F 13/00  (2006.01)
(52) U.S. Cl. ........................ 710/262; 710/48; 710/260
(58) Field of Classification Search .................. 710/48, 710/260, 262
See application file for complete search history.

(56) References Cited

U.S. PATENT DOCUMENTS 7,089,338 B1 *  8/2006  Wooten et al. .............. 710/110
2004/0022204 A1 *  2/2004  Trembley .................... 370/285
2005/0002384 A1  1/2005  Larson et al.
2005/0091427 A1 *  4/2005  Yoshida et al. ................ 710/48
2005/0228915 A1  10/2005  Saripalli et al.

OTHER PUBLICATIONS

Philips Semiconductors. The $I^2C$-Bus Specification Version 2.1, Jan., 2000, pp. 2-46.

* cited by examiner

Primary Examiner—Glenn A Auve
(74) Attorney, Agent, or Firm—McDermott Will & Emery LLP

(57) ABSTRACT

An I2C bus control circuit includes a continuous transmission control section in addition to a transmission control section, a sequence control section, a data line control section, and a clock line control section. The continuous transmission control section has a number-of-continuous transmission bytes register and first to $(n-1)^{th}$ continuous transmission data registers, and supplies an interrupt signal to the controller when continuous transmission is completed or an error is detected. The number of times the controller conducts interrupt processing is thus reduced and the processing time is reduced.

6 Claims, 10 Drawing Sheets

FIG. 2
PRIOR ART

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| — | — | — | — | — | — | STO | STA | D7 | D6 | D5 | D4 | D3 | D2 | D1 | D0 |

D0-7 : 8-BIT TRANSMISSION DATA

STA : START CONDITION CONTROL BIT

STO : STOP CONDITION CONTROL BIT

NACK RECEPTION
ERROR INTERRUPT

SET STOP CONDITION CONTROL
BIT WHEN NACK IS RECEIVED

ARBITRATION LOST
ERROR INTERRUPT

WHEN DATA THAT IS OUTPUT TO I2C
BUS IS DIFFERENT FROM
TRANSMISSION DATA, STOP
TRANSMISSION AND SET STOP
CONDITION CONTROL BIT

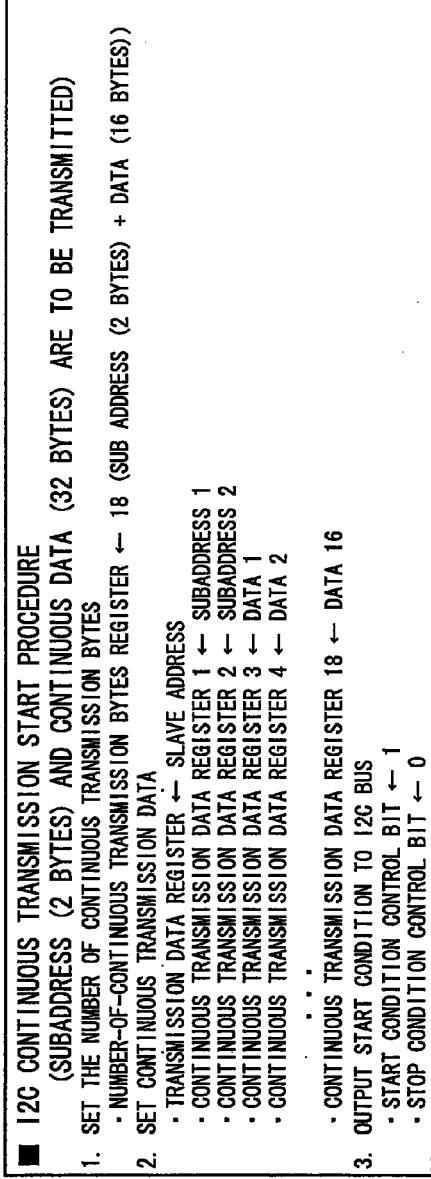
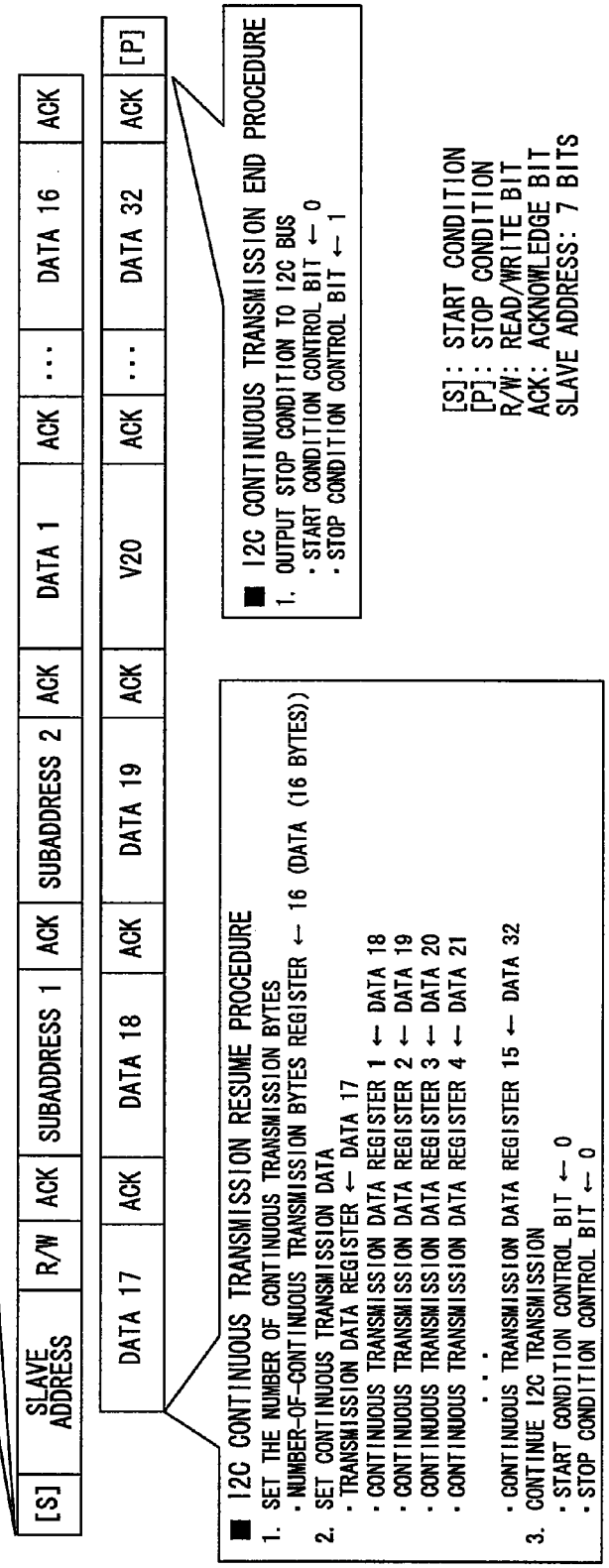
FIG. 9

I2C BUS CONTROL CIRCUIT

BACKGROUND OF THE INVENTION

1. Field of the Invention

The invention relates to an I2C bus control circuit that enables reduction in transmission time by efficiently using an I2C bus that is used for an interface between internal devices such as electronic equipments.

2. Background Art

I2C bus control needs to conform to the Philips I2C specification (see THE I2C-BUS SPECIFICATION VERSION 2.1, JANUARY 2000). This specification does not designate a method for implementing I2C bus control, but there are various methods for implementing I2C bus control.

Conventionally, an I2C bus control circuit connected to a controller usually processes data on a byte-by-byte basis. More specifically, a conventional I2C bus control circuit is connected to a controller for conducting controlling and monitoring operations. When the controller sets 1-byte transmission data to the I2C bus control circuit, the I2C bus control circuit transmits 1-byte data and then outputs an interrupt signal to the controller. The controller sets the next transmission data to the I2C bus control circuit in response to the interrupt signal. A plurality of continuous data signals are transmitted by repeating this operation.

FIG. 1 shows the structure of a conventional I2C bus control circuit 110 and a controller 119 connected to the I2C bus control circuit 110 for conducting monitoring and controlling operations. The I2C bus control circuit 110 includes a data line control section 111, a clock line control section 112, a transmission control section 113, and a sequence control section 116. The data line control section 111 is connected to a data line (SDA) of an I2C bus 123. The clock line control section 112 is connected to a clock line (SCL) of the I2C bus 123. The transmission control section 113 controls transmission according to the setting by the controller 119. The sequence control section 116 conducts status management, error detection, timing control, and the like. The transmission control section 113 has a transmission data register 114 and a parallel-to-serial conversion section 115. The sequence control section 116 has an arbitration section 117 and an error detection section 118. FIG. 2 shows the structure of the transmission data register 114 of the transmission control section 113.

The I2C bus control circuit 110 of FIG. 1 conducts data transmission as follows: data is set to the transmission data register 114 of the transmission control section 113. In synchronization with the timing generated by the sequence control section 116, the parallel-to-serial conversion section 115 converts the data in the transmission data register 114 of the transmission control section 113 and transmits the resultant data to the data line control section 111. The data line control section 111 and the clock line control section 112 respectively control the data line (SDA) and the clock line (SCL) in synchronization with the timing generated by the sequence control section 116.

The controller 119 includes a ROM (read only memory) 120 and a RAM (random access memory) 121. A program for controlling the I2C bus control circuit 110 is stored in the ROM 120 and data to be used during execution of the program is stored in the RAM 121. The controller 119 controls the I2C bus control circuit 110 by executing the program stored in the ROM 120 to transmit a plurality of continuous data signals.

Hereinafter, a processing flow of the program will be described.

STEP 1: A plurality of continuous transmission data signals and the number of transmission data signals are stored in the RAM 121. The program is terminated when the number of transmission data signals is zero.

STEP 2: The first byte of the plurality of continuous transmission data signals and a START condition control bit (a STOP condition control bit is not set) is set to the transmission data register 114 according to the configuration of the transmission data register 114 of the transmission control section 113, and the number of transmission data signals in the RAM 121 is decremented by one.

STEP 3: The START condition and the 1-byte data are transmitted in the I2C bus control circuit 110. After the transmission is completed, an interrupt signal 122 is transmitted from the sequence control section 116 of the I2C bus control circuit 110 to the controller 119. In the case where the number of transmission data signals in the RAM 121 is one or more, the next byte of the plurality of continuous transmission data signals (a START condition control bit and a STOP condition control bit are not set) is set to the transmission data register 114, and the number of transmission data signals in the RAM 121 is decremented by one. In the case where the number of transmission data signals in the RAM 121 is zero, a STOP condition control bit (a START condition control bit and transmission data are not set) is set to the transmission data register 114 and the I2C bus control circuit 110 transmits the STOP condition.

STEP 4: The 1-byte data is transmitted in the I2C bus control circuit 110. After the transmission is completed, an interrupt signal 122 is transmitted from the sequence control section 116 of the I2C bus control circuit 110 to the controller 119. In the case where the number of transmission data signals in the RAM 121 is one or more, the next byte of the plurality of continuous transmission data signals (a START condition control bit and a STOP condition control bit are not set) is set to the transmission data register 114, and the number of transmission data signals in the RAM 121 is decremented by one. In the case where the number of transmission data signals in the RAM 121 is zero, a STOP condition control bit (a START condition control bit and transmission data are not set) is set to the transmission data register 114 and the I2C bus control circuit 110 transmits the STOP condition.

STEP 5: Step 4 is repeated.

Transmission of a plurality of continuous data signals is thus implemented by the conventional I2C bus control circuit 110. FIG. 3 is an example of waveforms on the I2C bus 123 obtained when a plurality of continuous data signals are transmitted by the conventional I2C bus control circuit 110.

In the example of FIG. 1, the I2C bus control circuit 110 and the controller 119 are provided as separate devices and connected to each other. However, there are examples in which the I2C bus control circuit 110 and the controller 119 are provided in the same device as a microcontroller 1010 including an I2C bus control circuit.

As has been described above, transmission of a plurality of continuous data signals is implemented by the conventional I2C bus control circuit 110 connected to and controlled by the controller 119. In this structure, the timing of setting transmission data is implemented by an interrupt signal 122 from the I2C bus control circuit 110. The transmission time of a plurality of continuous data signals not only depends on the clock cycle of the I2C bus 123 but includes overhead of the interrupt processing of the controller 119. In other words, the time corresponding to a product of the overhead of the interrupt processing of the controller 119 and the number of transmission bytes is wasted.

Moreover, the I2C bus specification has been extended in recent years, enabling high speed communication. Therefore, the impact of the interrupt processing overhead has been increasing.

Furthermore, improved functionality of electronic equipments such as AV (audio visual) equipments has increased the amount of communication on the I2C bus in the equipments, which affects performance of the electronic equipments. For example, in the case where the channel is switched on a television, data corresponding to a video processing device, a sound processing device, and the like is usually transmitted all at once according to a video format and a sound format of the switched channel, and video mute and sound mute are ON during transmission of the data so that no distorted video and sound are output. If the transmission time is long, video mute and sound mute are kept ON for a long time, which bothers the viewers.

SUMMARY OF THE INVENTION

It is an object of the invention to reduce the communication time by adding a continuous transmission function to the conventional structure and reducing the number of times an interrupt processing is performed by generating an interrupt signal after continuous transmission is completed.

In order to achieve the above object, according to the invention, an I2C bus control circuit connected to a controller for conducting controlling and monitoring operations includes: a sequence control section for generating a first interrupt signal after transmission of each byte; and a continuous transmission control section for disabling the first interrupt signal from the sequence control section a number of times that is smaller than a designated number "n" from the controller by one, and transmitting to the controller a second interrupt signal obtained by enabling the $n^{th}$ first interrupt signal from the sequence control section.

According to the invention, communication time of electronic equipments using an I2C bus control circuit can be easily reduced at low cost by correcting only an I2C bus control circuit additionally having a continuous transmission function and a program of a controller. Capability of the electronic equipments can thus be improved.

BRIEF DESCRIPTION OF THE DRAWINGS

FIG. 2 shows the configuration of a transmission data register of the conventional I2C bus control circuit;

FIG. 9 shows another example of the continuous transmission procedure in the I2C bus control circuit of FIG. 4;

DETAILED DESCRIPTION OF THE INVENTION

Hereinafter, a specific example of an I2C bus control circuit according to the invention and application examples thereof will be described with reference to FIGS. 4 through 11.

Figure 1:
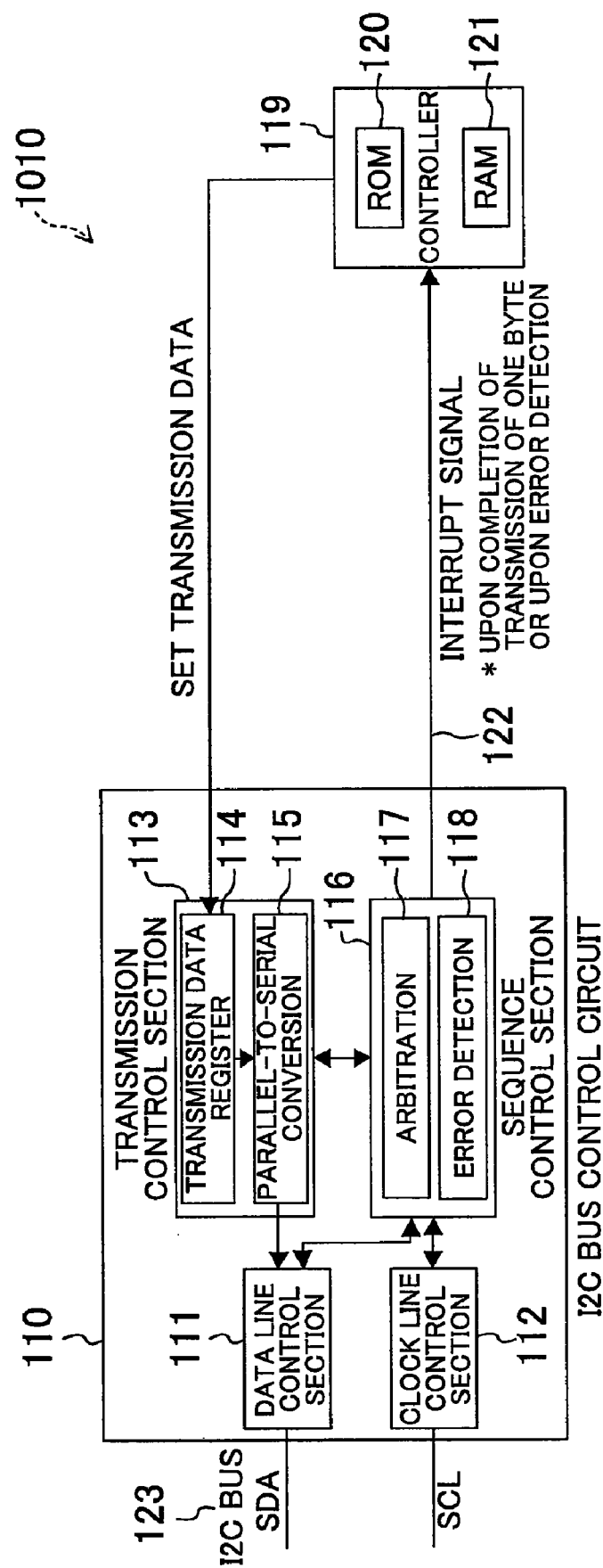
FIG. 1 shows the structure of a conventional I2C bus control circuit and a controller connected to the I2C bus control circuit for conducting monitoring and controlling operations.
Figure 3:
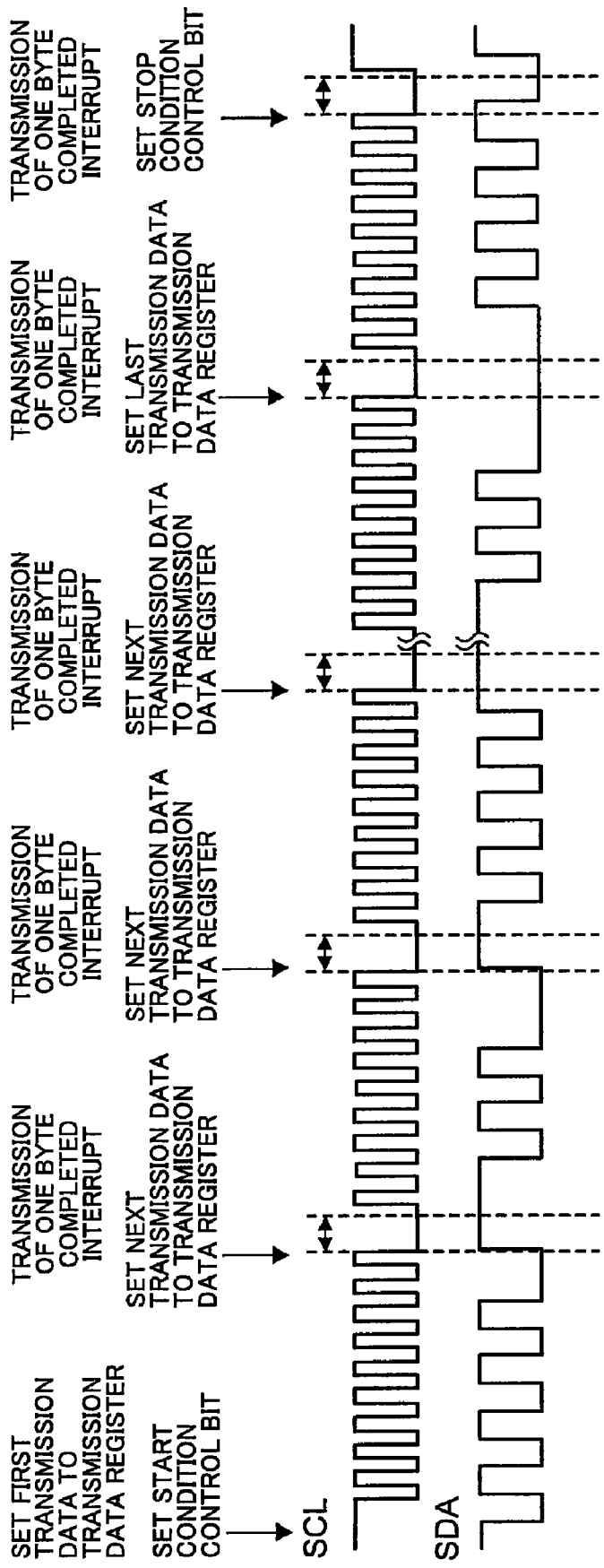
FIG. 3 is a waveform diagram of an I2C bus which is obtained when continuous transmission is conducted by the conventional I2C bus control circuit.
Figure 4:
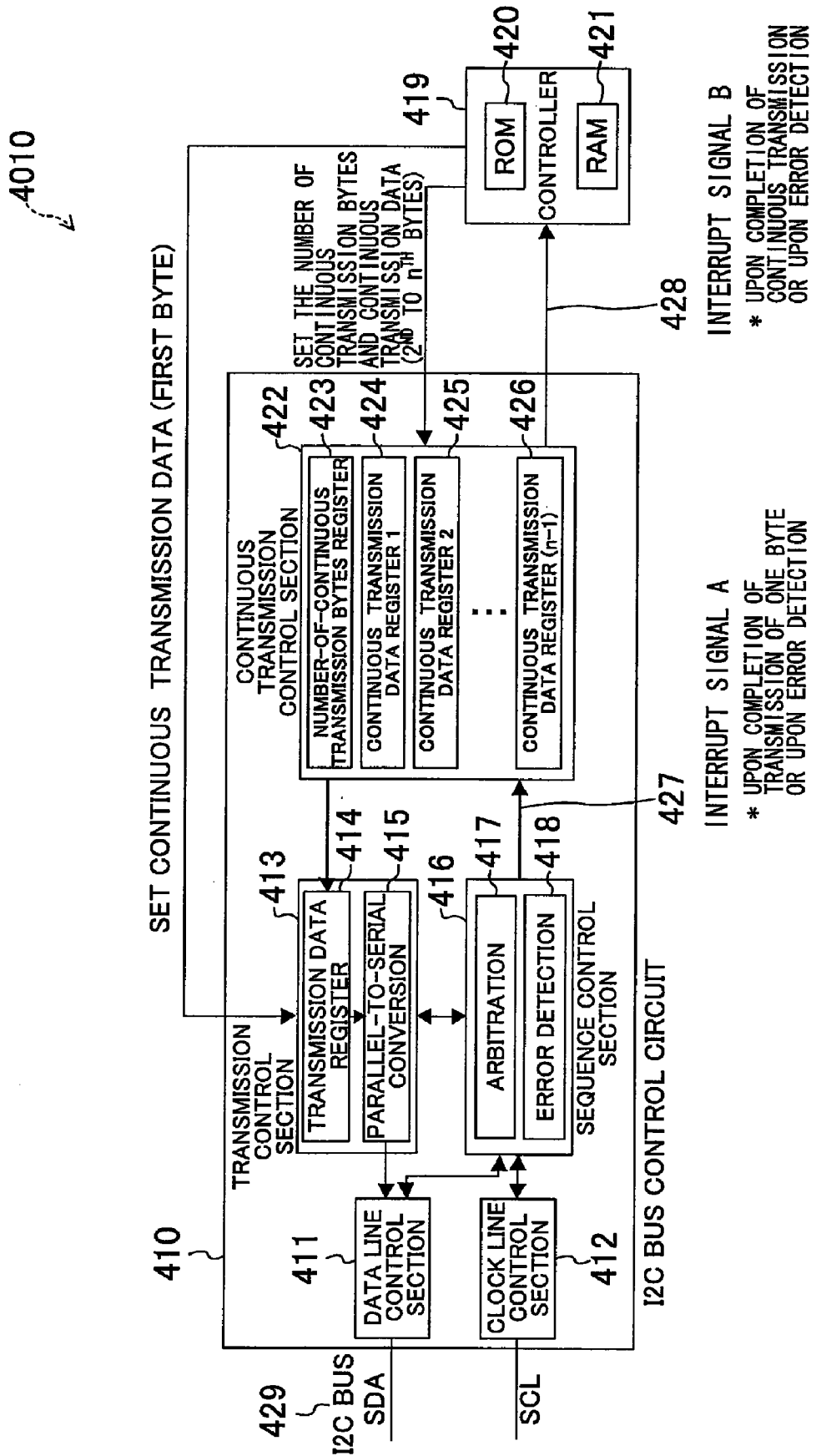
FIG. 4 shows the structure of an I2C bus control circuit according to the invention and a controller connected to the I2C bus control circuit for conducting monitoring and controlling operations.

FIG. 4 shows the structure of an I2C bus control circuit 410 according to the invention. As in the conventional structure, the I2C bus control circuit 410 has a transmission control section 413, a sequence control section 416, a data line control section 411, and a clock line control section 412. The transmission control section 413 includes a transmission data register 414 and a parallel-to-serial conversion section 415. The sequence control section 416 includes an arbitration section 417 and an error detection section 418. The data line control section 411 is connected to a data line (SDA) of an I2C bus 429. The clock line control section 412 is connected to a clock line (SCL) of the I2C bus 429. In addition to the conventional structure, the I2C bus control circuit 410 includes a continuous transmission control section 422. The continuous transmission control section 422 includes a number-of-continuous transmission bytes register 423, a first continuous transmission data register 424, and a second continuous transmission data register 425 through a $(n-1)^{th}$ continuous transmission data register 426. A controller 419 is connected to the I2C bus control circuit 410 for conducting monitoring and controlling operations. The controller 419 includes a ROM 420 and a RAM 421.

It is herein assumed that n-byte data (where n is a positive integer) is transmitted by the I2C bus control circuit 410 of FIG. 4. The n-byte data is formed by data "1," data "2," . . . , data "n."

First, n is set to the number-of-continuous transmission bytes register 423 of the continuous transmission control section 422, and data "2" through data "n" are set to the first continuous transmission data register 424 and the second continuous transmission data register 425 through the $(n-1)^{th}$ continuous transmission data register 426, respectively. It is herein assumed that the continuous transmission data registers in the continuous transmission control section 422 are (n-1) bytes or more.

Data "1", the first byte to be transmitted, is set to the transmission data register 414 of the transmission control section 413 and the transmission control section 413 conducts transmission. Upon reception of an acknowledge signal ACK for data "1," the sequence control section 416 generates a first interrupt signal (A) 427 and outputs the first interrupt signal (A) 427 to the continuous transmission control section 422. The continuous transmission control section 422 sets data "2" in the first continuous transmission data register 424 to the transmission data register 414 of the transmission control section 413, and the I2C bus control circuit 410 conducts the next data transmission. Upon reception of an acknowledge signal ACK for data "2," the sequence control section 416 applies a first interrupt signal (A) 427 to the continuous transmission control section 422. The continuous transmission control section 422 sets data "3" in the second continuous transmission data register 425 to the transmission data register 414 of the transmission control section 413, and the I2C bus control circuit 410 conducts the next data transmission. The same operation is repeated until data "n" is transmitted.

Figure 5:
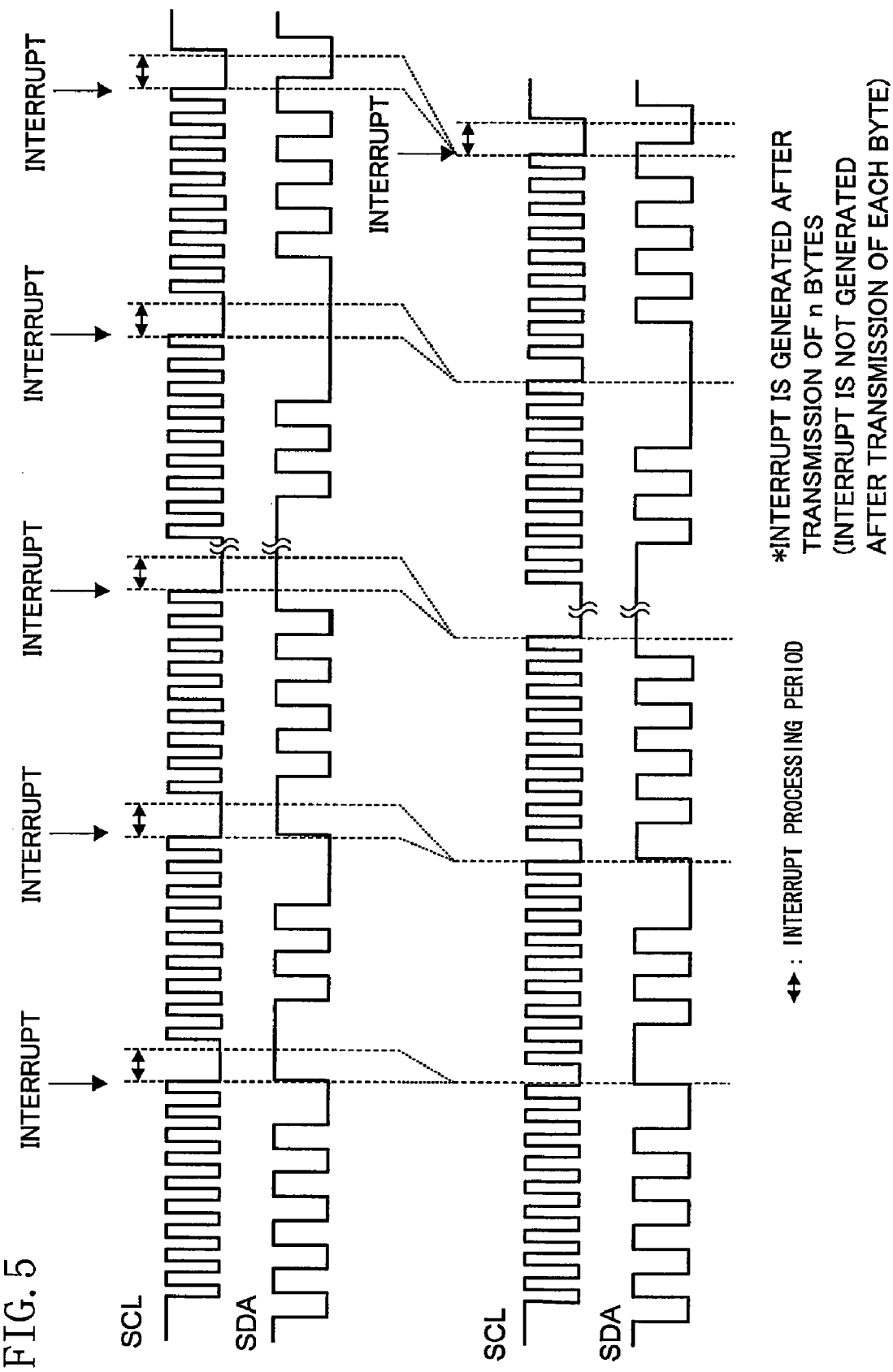
FIG. 5 is a waveform diagram of an I2C bus, illustrating comparison between the conventional example and the invention.
Figure 6:
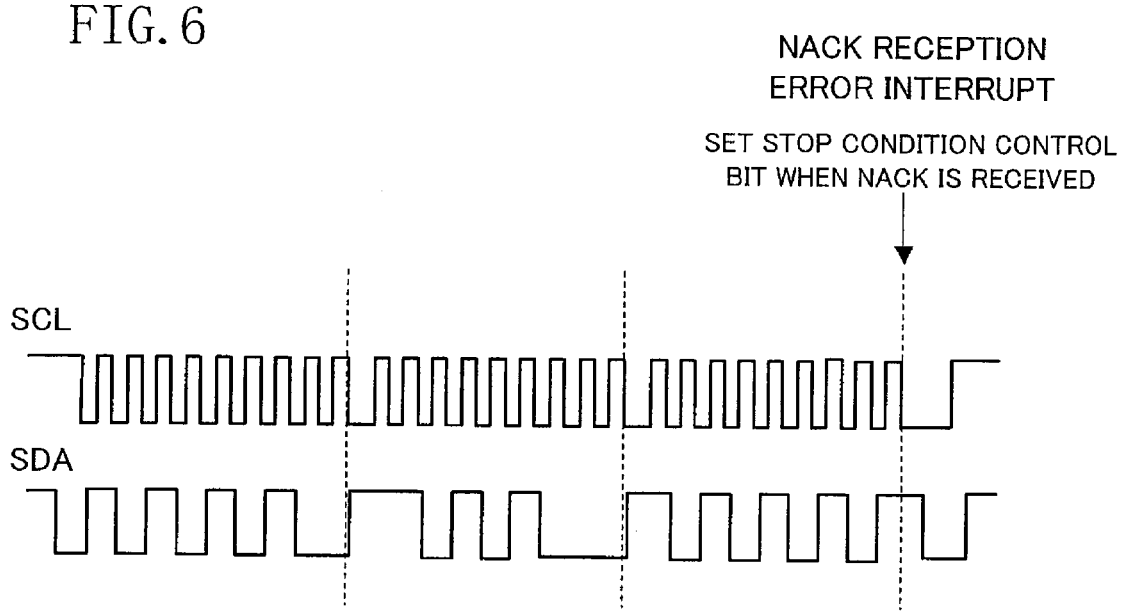
FIG. 6 is a waveform diagram upon detection of NACK (not acknowledge) reception in the I2C bus control circuit of FIG. 4.
Figure 7:
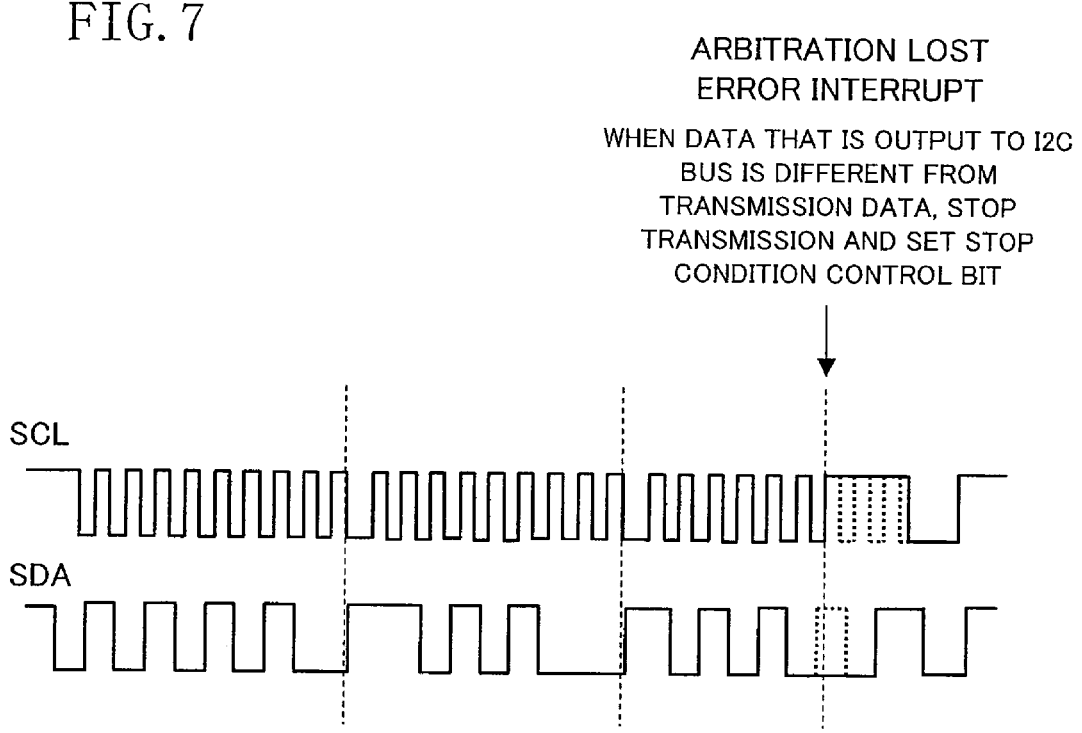
FIG. 7 is a waveform diagram upon detection of an arbitration lost error in the I2C bus control circuit of FIG. 4.
Figure 8:
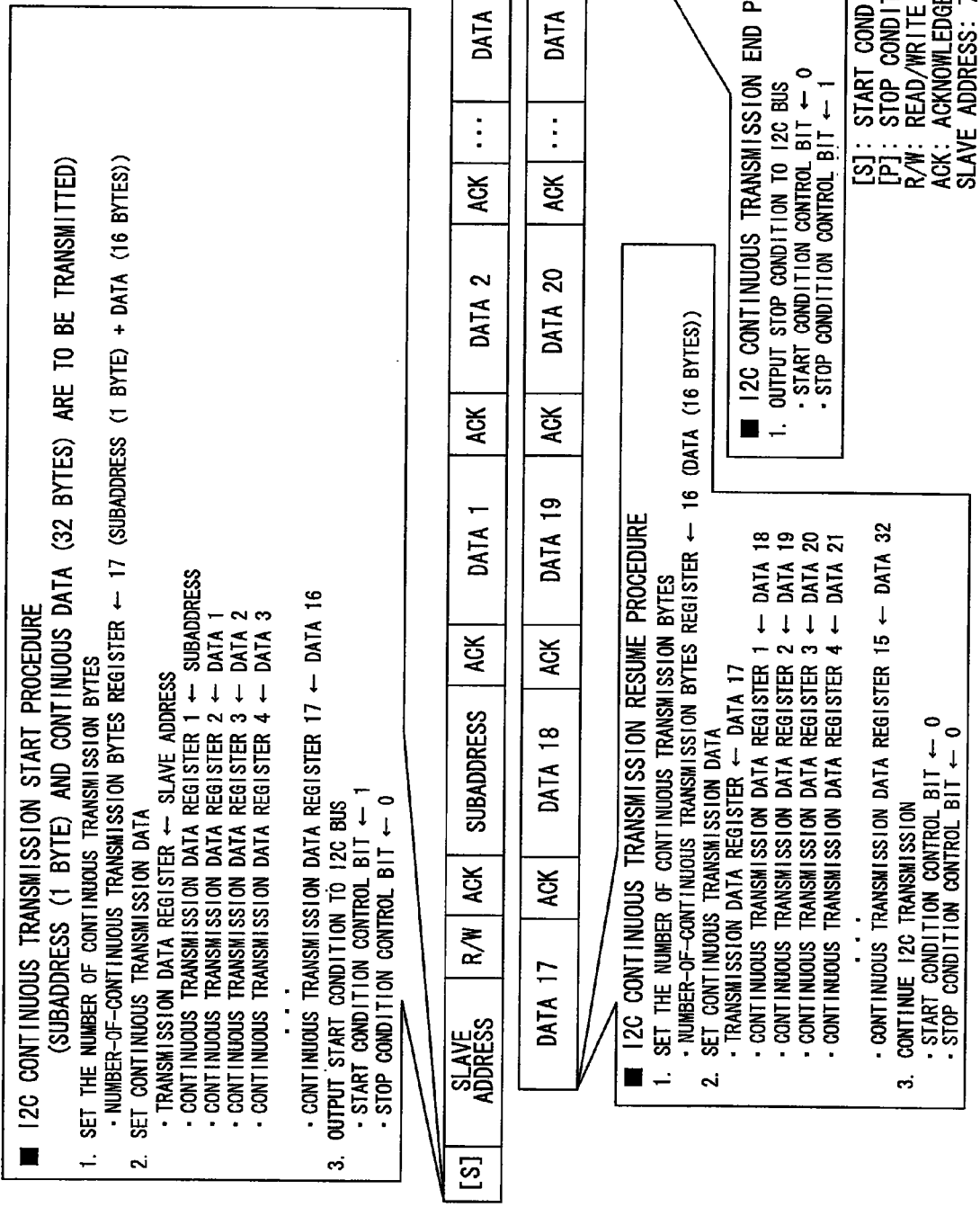
FIG. 8 shows an example of a continuous transmission procedure in the I2C bus control circuit of FIG. 4.

When an acknowledge signal ACK for data "n" of the $n^{th}$ byte (the last byte) is received and the sequence control section 416 generates a first interrupt signal (A) 427, the continuous transmission control section 422 generates a second interrupt signal (B) 428 to inform the controller 419 that transmission of n bytes is completed (see the lower half of FIG. 5).

In the conventional example, an interrupt signal is applied to the controller and software processing is conducted after each byte is transmitted (see the upper half of FIG. 5). However, the above structure eliminates the processing between transmissions of each byte, thereby improving the overall processing speed.

In the case where the number of data signals to be transmitted is M (M>n), data "n+2" and all of the following data are respectively set to the first continuous transmission data register 424 through the $(n-1)^{th}$ continuous transmission data register 426 of the continuous transmission control section 422 and data "n+1" is set to the transmission data register 414 of the transmission control section 413, and the next continuous transmission is conducted. This operation is repeated until transmission of M data signals is completed.

In the case where a not-acknowledge signal NACK rather than an acknowledge signal ACK is received or an error is generated during continuous data transmission, the error detection section 418 of the sequence control section 416 generates a first interrupt signal (A) 427. The continuous transmission control section 422 stops transmission in response to the first interrupt signal (A) 427 and sets a STOP condition control bit (a START condition control bit and transmission data are not set to the data) to the transmission data register 414 by a second interrupt signal (B) 428 applied to the controller 419. The I2C bus control circuit 410 thus transmits the STOP condition (see FIGS. 6 and 7). In order to conduct retransmission, data is set to the transmission data register 414 from data "1" so that transmission is started from data "1."

In the above description, the first data of continuous transmission data is set to the transmission data register 414 of the transmission control section 413. However, this is by way of example only. Alternatively, all the continuous transmission data may be set to the continuous transmission data registers 424 through 426 and transmission may be triggered by another register or the like.

A method of designating a slave address and a subaddress is often used in the I2C communication. It is herein assumed that the maximum number of data signals that can be set to the transmission data register 414 of the transmission control section 413 and the continuous transmission data registers 424 through 426 of the continuous transmission control section 422 is [slave address]+[subaddress]+[the number of data signals] and the number of data signals is $2^k$ (where k is a positive integer). In other words, the maximum number that can be set to the number-of-continuous transmission bytes register 423 of the continuous transmission control section 422 is "$2+2^k$" when the subaddress is one byte and "$3+2^k$" when the subaddress is 2 bytes. The number of data signals is herein shown by $2^k$ because the data size is usually $2^k$ such as 16 bytes.

More specifically, when k is 4 (that is, when the number of data signals is 16 bytes) and the subaddress is 2 bytes, the maximum number that can be set to the number-of-continuous transmission bytes register 423 is 1+2+16=19 bytes. In the case where the number of data signals is larger than 16, the remaining data signal or signals is transmitted after transmission of the first 19 bytes including the addresses is completed and an interrupt is generated. In the case where only the data is to be transmitted, transmission is conducted on a 16-bytes by 16-bytes basis (on a $2^k$ by $2^k$ basis), whereby software controlled transmission is efficiently conducted (see FIGS. 8 and 9).

In FIG. 4, the I2C bus control circuit 410 and the controller 419 are provided as separate devices and connected to each other. Alternatively, the I2C bus control circuit 410 and the controller 419 may be provided in the same device as a microcontroller 4010 including an I2C bus control circuit.

Figure 10:
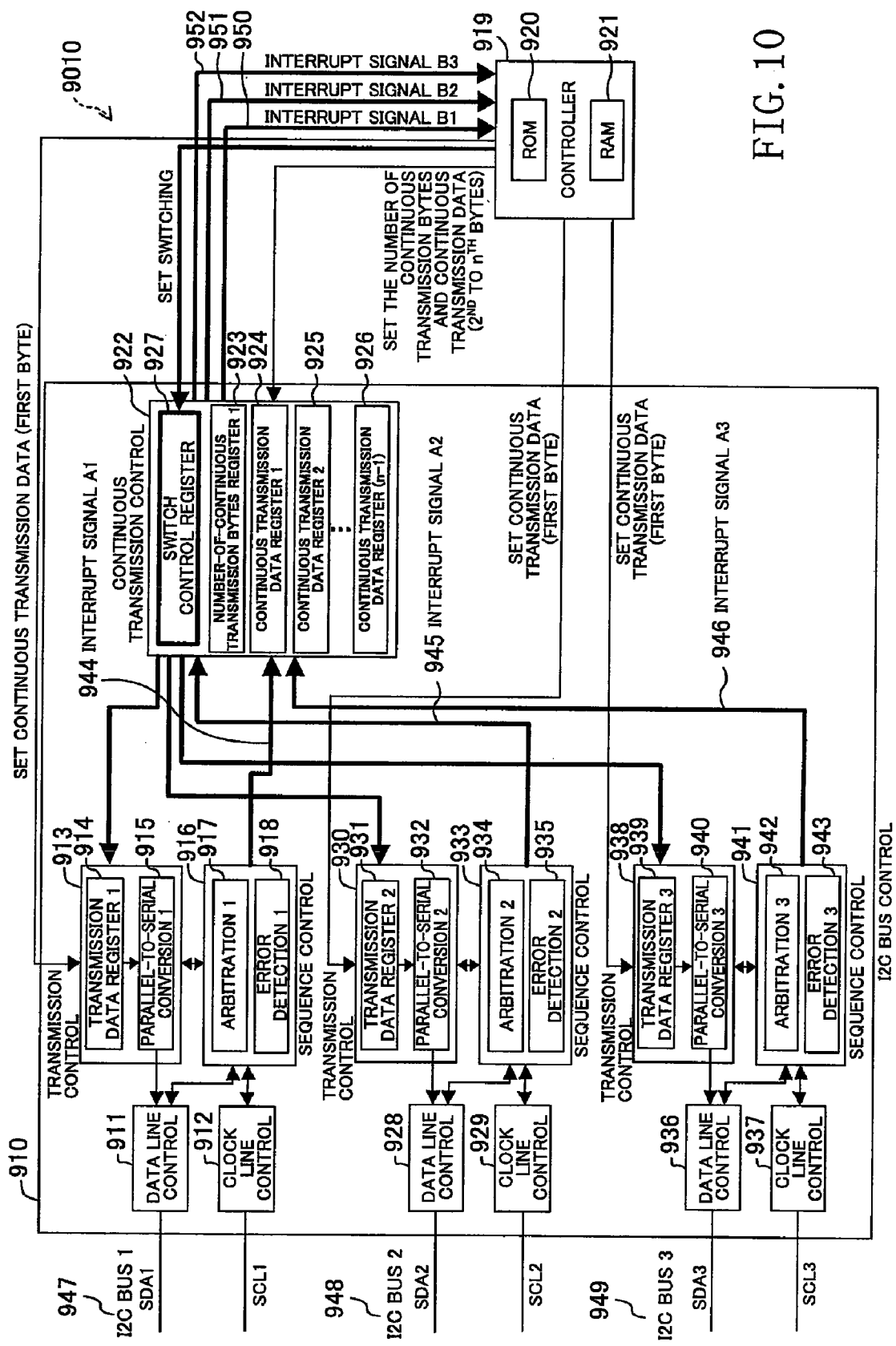
FIG. 10 shows the structure of another I2C bus control circuit according to the invention and a controller connected to the I2C bus control circuit for conducting monitoring and controlling operations.

FIG. 10 shows the structure of an I2C bus control circuit 910. The I2C bus control circuit 910 includes a continuous transmission control section 922, first, second, and third transmission control sections 913, 930, and 938, and first, second, and third sequence control sections 916, 933, and 941. The continuous transmission control section 922 additionally includes a switch control register 927.

More specifically, the I2C bus control circuit 910 of FIG. 10 includes a first transmission control section 913, a first sequence control section 916, a first data line control section 911, a first clock line control section 912, a second transmission control section 930, a second sequence control section 933, a second data line control section 928, a second clock line control section 929, a third transmission control section 938, a third sequence control section 941, a third data line control section 936, and a third clock line control section 937. The first transmission control section 913 includes a transmission data register 914 and a parallel-to-serial conversion section 915. The first sequence control section 916 includes an arbitration section 917 and an error detection section 918. The first data line control section 911 is connected to a data line (SDA1) of a first I2C bus 947. The first clock line control section 912 is connected to a clock line (SCL1) of the first I2C bus 947. The second transmission control section 930 includes a transmission data register 931 and a parallel-to-serial conversion section 932. The second sequence control section 933 includes an arbitration section 934 and an error detection section 935. The second data line control section 928 is connected to a data line (SDA2) of a second I2C bus 948. The second clock line control section 929 is connected to a clock line (SCL2) of the second I2C bus 948. The third transmission control section 938 includes a transmission data register 939 and a parallel-to-serial conversion section 940. The third sequence control section 941 includes an arbitration section 942 and an error detection section 943. The third data line control section 936 is connected to a data line (SDA3) of a third I2C bus 949. The third clock line control section 937 is connected to a clock line (SCL3) of the third I2C bus 949. The continuous transmission control section 922 includes the switch control register 927 in addition to a number-of-continuous transmission bytes register 923, a first continuous transmission data register 924, and a second continuous transmission data register 925 through a $(n-1)^{th}$ continuous transmission data register 926. A controller 919 is connected to the I2C bus control circuit 910 for conducting monitoring and controlling operations. The controller 919 includes a ROM 920 and a RAM 921.

A first interrupt signal (A1) 944 is a signal from the first sequence control section 916 to the continuous transmission control section 922 and a corresponding second interrupt signal (B1) 950 is a signal from the continuous transmission control section 922 to the controller 919. A first interrupt signal (A2) 945 is a signal from the second sequence control section 933 to the continuous transmission control section 922 and a corresponding second interrupt signal (B2) 951 is a signal from the continuous transmission control section 922 to the controller 919. A first interrupt signal (A3) 946 is a signal from the third sequence control section 941 to the continuous transmission control section 922 and a corresponding second interrupt signal (B3) 952 is a signal from the continuous transmission control section 922 to the controller 919.

In the structure of FIG. 10, the switch control register 927 of the continuous transmission control section 922 switches a transmission control section among the first, second, and third transmission control sections 913, 930, and 938. This enables continuous transmission on the first, second, and third I2C buses 947, 948, and 949 although there is only one continuous transmission control section 922. Providing respective continuous transmission control sections 922 for the I2C buses 947, 948, and 949 increases the circuit size. However, since this structure has only one continuous transmission control section 922, an increase in circuit size can be suppressed.

For example, it is herein assumed that continuous transmission is conducted on the first I2C bus 947. On the first I2C bus 947, an acknowledge signal ACK is received and a first interrupt signal (A1) 944 is output to the continuous transmission control section 922 after each byte is transmitted. The switch control register 927 of the continuous transmission control section 922 determines whether the first transmission control section 913 is conducting continuous transmission or not. When it is determined that the first transmission control section 913 is conducting continuous transmission, data of the following continuous transmission data register 924 through 926 is set to the transmission data register 914 of the first transmission control section 913 and the next data transmission is conducted.

In the case where continuous transmission is conducted on the second I2C bus 948, the controller 919 sets transmission data to the transmission data register 931 of the second transmission control section 930 on a byte-by-byte basis. Upon reception of an acknowledge signal ACK on the second I2C bus 948, the second sequence control section 933 generates a first interrupt signal (A2) 945 and the switch control register 927 of the continuous transmission control section 922 determines whether the second transmission control section 930 is conducting continuous transmission or not. When it is determined that the second transmission control section 930 is not conducting continuous transmission, the continuous transmission control section 922 outputs a second interrupt signal (B2) 951 to the controller 919. The controller 919 sets the next transmission data to the transmission data register 931 of the second transmission control section 930.

In the case where there is transmission data for the second transmission control section 930 after transmission on the first I2C bus 947 is completed, the switch control register 927 of the continuous transmission control section 922 switches the transmission control section to the second transmission control section 930, and data to be transmitted to the second I2C bus 948 is set to the transmission data register 931 of the second transmission control section 930 and the continuous transmission data registers 924 through 926 of the continuous transmission control section 922 and the number-of-continuous transmission bytes register 923 is set. Continuous transmission on the second I2C bus 948 can thus be conducted.

The relation between the first I2C bus 947 and the second I2C bus 948 is described above. The same description applies to the third I2C bus 949.

In FIG. 10, the I2C bus control circuit 910 and the controller 919 are provided as separate devices and connected to each other. Alternatively, the I2C bus control circuit 910 and the controller 919 may be provided in the same device as a microcontroller 9010 including an I2C bus control circuit.

Hereinafter, a broadcasting receiving device using an I2C bus control circuit according to the invention will be described.

Figure 11:
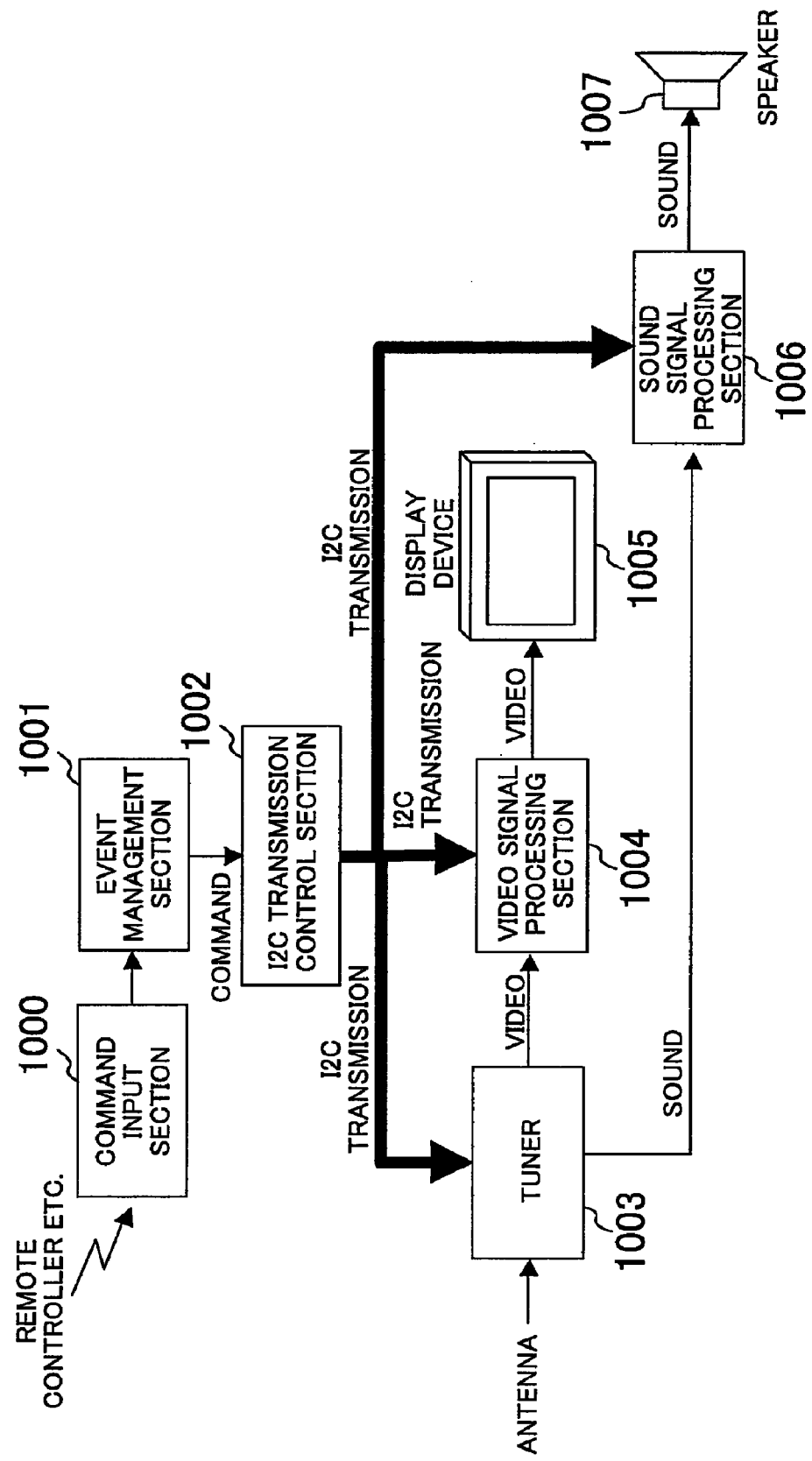
FIG. 11 is a block diagram of a broadcasting receiving device using an I2C bus control circuit according to the invention.

FIG. 11 is a schematic functional block diagram of a broadcasting receiving device of the invention. The broadcasting receiving device is a broadcasting receiving device in a terrestrial analog television system and includes a command input section 1000, an event management section 1001, an I2C transmission control section 1002, a terrestrial analog tuner section 1003, a video signal processing section 1004, and a sound signal processing section 1006. The video signal processing section 1004 is connected to a display device 1005 and the sound signal processing section 1006 is connected to a speaker 1007.

The terrestrial analog tuner section 1003 receives a video/sound signal from an antenna. The video signal processing section 1004 processes a video signal from the terrestrial analog tuner section 1003. The sound signal processing section 1006 processes a sound signal from the terrestrial analog tuner section 1003. The command input section 1000 decodes a transmitted code from a remote controller. The event management section 1001 determines an event that is received from the command input section 1000 and gives a command to the I2C transmission control section 1002. The I2C transmission control section 1002 has any of the above I2C bus control circuits of the invention and transmits data to at least one of the terrestrial analog tuner section 1003, the video signal processing section 1004, and the sound signal processing section 1006 according to the command from the event management section 1001.

The broadcasting receiving device can thus be implemented by using the I2C bus control circuit of the invention.

A command is applied from the remote controller in the above example. However, the invention is not limited to the remote controller, and any man-machine interface can be used.

In the above example, a broadcasting receiving device in a terrestrial analog television system is used as the terrestrial analog tuner portion. However, a broadcasting receiving device in a digital television system can be implemented by replacing the analog tuner with a digital tuner.

The I2C bus control circuit of this invention is applied to the broadcasting receiving device of the invention. However, the invention is applicable not only to a broadcasting receiving device but to any electronic equipment that implements communication between internal devices through an I2C bus, such as a cellular phone and a car navigation system.

As has been described above, the I2C bus control circuit of this invention can reduce the communication time of the I2C bus that is used in electronic equipments and thus can improve capability of the electronic equipments. Since only the I2C bus control circuit and the program of the controller are corrected, the invention can be applied to the conventional electronic equipments at low cost in a short time.

Especially in a digital television that has been increasingly popular in recent years, a corresponding video format and sound format have been diversified and the image quality and sound quality have been improved. Therefore, an increased amount of data needs to be transmitted on the I2C bus when the channel is switched, increasing the channel switching time. The invention is useful as one of the technologies for solving this problem.

What is claimed is:

1. An I2C bus control circuit connected to a controller, said I2C bus control circuit comprising:
   a sequence control section for generating a first interrupt signal after transmission of each byte;
   a transmission byte number register which stores a number of transmission bytes n; and
   a continuous transmission control section for disabling the first interrupt signal from the sequence control section a number of times which is one less than the stored number of transmission bytes n, and transmitting to the controller a second interrupt signal obtained by enabling the $n^{th}$ first interrupt signal from the sequence control section.

2. The I2C bus control circuit according to claim 1, wherein a maximum number stored in the transmission byte number register is $2+2^k$, where $2^k$ corresponds to a number of data signals to be transmitted.

3. The I2C bus control circuit according to claim 1, wherein a maximum number stored in the transmission byte number register is $3+2^k$, where $2^k$ corresponds to a number of data signals to be transmitted.

4. The I2C bus control circuit according to claim 1, wherein the sequence control section includes an error detection section for detecting reception of a not-acknowledge signal (NACK) and an arbitration lost, wherein transmission is stopped when the NACK reception or the arbitration lost is detected.

5. An I2C bus control circuit connected to a controller, said I2C bus control circuit comprising: a plurality of sequence control sections for generating a first interrupt signal after transmission of each byte; a transmission byte number register which stores a number of transmission bytes n; and a continuous transmission control section, disabling a first interrupt signal (Ax) (where x is a designated number) of one of the plurality of sequence control sections designated by the controller a number of times which is one less than the stored number of transmission bytes n, transmitting to the controller a second interrupt signal (Bx) obtained by enabling the $n^{th}$ first interrupt signal (Ax) from the sequence control section, and transmitting a first interrupt signal (other than Ax) of another one of the plurality of sequence control sections that is not designated by the controller to the controller after transmission of each byte.

6. A device for receiving a broadcast television signal and outputting video and sound by demodulating a video signal and a sound signal of the received television signal, comprising:
   a television signal receiving section for receiving the television signal through a broadcasting path;
   a command input section for receiving a command from an operator;
   an event management section for obtaining a processing to be performed, based on an input from the command input section and a current status;
   a video signal processing section for demodulating the video signal;
   a sound signal processing section for demodulating the sound signal; and
   an I2C transmission control section having an I2C bus control circuit connected to a controller in the event management section, for transmitting data to at least one of the television signal receiving section, the video signal processing section, and the sound signal processing section connected to a same I2C bus according to a command from the event management section, wherein
   the I2C bus control circuit includes a sequence control section for generating a first interrupt signal after transmission of each byte, a transmission byte number register which stores a number of transmission bytes n, and a continuous transmission control section for disabling the first interrupt signal from the sequence control section a number of times which is one less than the stored number of transmission bytes n, and transmitting to the controller a second interrupt signal obtained by enabling the $n^{th}$ first interrupt signal from the sequence control section.

* * * * *